United States Patent
Hara

(10) Patent No.: US 10,634,018 B2
(45) Date of Patent: Apr. 28, 2020

(54) INTERNAL COMBUSTION ENGINE

(71) Applicant: TOYOTA JIDOSHA KABUSHIKI KAISHA, Toyota-shi (JP)

(72) Inventor: Hiroki Hara, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 196 days.

(21) Appl. No.: 15/088,382

(22) Filed: Apr. 1, 2016

(65) Prior Publication Data

US 2017/0022856 A1   Jan. 26, 2017

(30) Foreign Application Priority Data

Jul. 22, 2015  (JP) .................. 2015-145048

(51) Int. Cl.
*F01L 9/02* (2006.01)
*F01L 1/047* (2006.01)
(Continued)

(52) U.S. Cl.
CPC .............. *F01L 9/026* (2013.01); *B60T 17/02* (2013.01); *F01L 1/047* (2013.01); *F01L 1/053* (2013.01);
(Continued)

(58) Field of Classification Search
CPC . F01L 9/026; F01L 1/047; F01L 1/053; F01L 1/24; F01L 1/2405; F01L 1/2411;
(Continued)

(56) References Cited

U.S. PATENT DOCUMENTS

| | | | | |
|---|---|---|---|---|
| 5,517,959 A | * | 5/1996 | Kato .................. | F01M 1/02 123/196 AB |
| 2005/0061289 A1 | * | 3/2005 | Plenzler ............... | F01L 1/022 123/196 M |

(Continued)

FOREIGN PATENT DOCUMENTS

| CN | 1930396 | 3/2007 |
|---|---|---|
| CN | 101067386 | 11/2007 |

(Continued)

OTHER PUBLICATIONS

Office Action dated Sep. 26, 2017 in Japanese Patent Application No. 2015-145048.

(Continued)

*Primary Examiner* — Jacob M Amick
*Assistant Examiner* — Omar Morales
(74) *Attorney, Agent, or Firm* — Oblon, McClelland, Maier & Neustadt, L.L.P.

(57) ABSTRACT

An internal combustion engine includes an intake camshaft, a vacuum pump, an oil pump, and an oil feeding passage serving as an oil supplying path. The vacuum pump includes a rotor and a housing. The vacuum pump is formed with a negative pressure chamber that generates a negative pressure, and an oil path connected to the negative pressure chamber. An atmosphere communication hole for supplying air to the negative pressure chamber through the oil feeding passage and the oil path when the vacuum pump is stopped is arranged in the oil feeding passage. The atmosphere communication hole communicates the negative pressure chamber and the atmosphere before an amount of oil in the housing exceeds an allowable oil amount when the vacuum pump is stopped.

5 Claims, 9 Drawing Sheets

(51) Int. Cl.
*F01L 1/24* (2006.01)
*F01L 1/18* (2006.01)
*F02M 59/44* (2006.01)
*F01L 1/46* (2006.01)
*F01L 1/053* (2006.01)
*F02B 67/04* (2006.01)
*B60T 17/02* (2006.01)
*F02B 63/06* (2006.01)
*F01M 9/10* (2006.01)

(52) U.S. Cl.
CPC .................. *F01L 1/18* (2013.01); *F01L 1/24* (2013.01); *F01L 1/2405* (2013.01); *F01L 1/46* (2013.01); *F01M 9/10* (2013.01); *F02B 63/06* (2013.01); *F02B 67/04* (2013.01); *F02M 59/44* (2013.01); *F01L 1/185* (2013.01); *F01L 2001/0537* (2013.01); *F01L 2001/2444* (2013.01); *F01L 2105/00* (2013.01); *F01L 2250/04* (2013.01); *F01L 2810/02* (2013.01)

(58) Field of Classification Search
CPC .............. F01L 1/185; F01L 2001/2444; F01L 2810/02; F01M 9/10
USPC ...................................... 123/196 R
See application file for complete search history.

(56) References Cited

U.S. PATENT DOCUMENTS

| | | | | |
|---|---|---|---|---|
| 2005/0199202 | A1* | 9/2005 | Hoi | F01M 1/06 123/90.33 |
| 2007/0215081 | A1* | 9/2007 | Frincke | F01L 1/04 123/90.16 |
| 2008/0240962 | A1* | 10/2008 | Ono | F04C 29/02 418/83 |
| 2011/0197833 | A1* | 8/2011 | Vorih | F01L 1/08 123/90.12 |

FOREIGN PATENT DOCUMENTS

| | | |
|---|---|---|
| JP | 2003-239882 A | 8/2003 |
| JP | 2006-118424 | 5/2006 |
| JP | 2008-157070 | 7/2008 |
| JP | 2009-185699 | 8/2009 |

OTHER PUBLICATIONS

Chinese Office Action dated May 3, 2018 for Chinese Application No. 201610206027.5.

* cited by examiner

US 10,634,018 B2

INTERNAL COMBUSTION ENGINE

BACKGROUND OF THE INVENTION

The present invention relates to an internal combustion engine including a vacuum pump.

Japanese Laid-Open Patent Publication No. 2006-118424, for example, discloses a conventional internal combustion engine including a vacuum pump that generates a negative pressure.

As shown in FIG. 16, a vacuum pump 200 disclosed in Japanese Laid-Open Patent Publication No. 2006-118424 includes a rotor 202, and a housing 203 that accommodates the rotor 202. The rotor 202 is coupled to a camshaft 201 to integrally rotate with the camshaft 201. The housing 203 rotatably supports the rotor 202.

As shown in FIG. 17, a plurality of vanes 204 is attached to the rotor 202 to be slidable in a radial direction of the rotor 202. The plurality of vanes 204 partitions the interior of the housing 203 into a plurality of spaces. A center axis of the rotor 202 is arranged to be decentered with respect to a center axis of the housing 203. Thus, when the rotor 202 is rotated, the capacity of each of the plurality of spaces in the housing 203 is changed. In other words, when the rotor 202 is rotated in the counterclockwise direction in FIG. 17, the capacity of space S1 is increased and the capacity of space S2 is decreased.

The housing 203 includes a suction port connected to a vacuum doubling device of a brake. The suction port is connected to the space S1 in the state shown in FIG. 17. When the capacity of the space S1 is increased, the air in the vacuum doubling device is suctioned into the space S1 of the vacuum pump 200 through the suction port. The negative pressure is thereby generated in the vacuum doubling device.

The housing 203 also includes an air discharge port. The discharge port is connected to the space S2 in the state shown in FIG. 17. Thus, when the capacity of the space S2 is decreased, the air in the space S2 is compressed and the air in the space S2 is discharged from the discharge port. Oil for lubrication is supplied to the vacuum pump 200.

As shown in FIG. 16, the camshaft 201 is formed with an oil feeding passage 205 extending in an axial direction. The rotor 202 is also formed with an oil path 206 extending in the axial direction. The oil feeding passage 205 of the camshaft 201 is connected to the oil path 206 of the rotor 202 by way of an oil feeding pump 207. A penetration path 208 extending in a radial direction of the rotor 202 is arranged in the oil path 206. An oil feeding groove 209 and a communication groove 210 are formed in the housing 203 to communicate with the space in the housing 203. Under the state shown in FIG. 16, the upper end of the penetration path 208 is connected to the oil feeding groove 209 of the housing 203, and the lower end of the penetration path 208 is connected to the communication groove 210 of the housing 203. The communication groove 210 is communicated to atmosphere through a gap between the rotor 202 and the housing 203. The space in the housing 203 is thus communicated to the oil feeding passage 205 and the atmosphere through the oil feeding groove 209 and the penetration path 208, respectively.

Therefore, when the camshaft 201 is rotated accompanying the operation of the internal combustion engine, the rotor 202 is rotated thus generating the negative pressure, and the oil is supplied to the vacuum pump 200 through the oil feeding passage 205 of the camshaft 201. When the operation of the internal combustion engine is stopped and the drive of the vacuum pump 200 is stopped, the oil is taken into the vacuum pump 200 by the negative pressure remaining in the vacuum pump 200. In this case, if a large amount of oil is taken into the vacuum pump 200, the resistance that acts on the vane 204 increases and the vane 204 may break when the vacuum pump 200 is driven again.

Furthermore, in the vacuum pump 200 described above, in the course of the vacuum pump 200 being stopped, the negative pressure in the vacuum pump 200 is consumed as a result of the space in the housing 203 intermittently communicating with the atmosphere through the communication groove 210 and the air being taken into the space in the housing 203. The oil is thus no longer taken into the vacuum pump 200 accompanying the stopping of the internal combustion engine.

In the vacuum pump 200 described in Japanese Laid-Open Patent Publication No. 2006-118424, noise is generated when discharging air from the discharge port. In order to reduce the discharging noise, which becomes the cause of an undesirable noise, it is desirable to suppress the amount of air discharged from the vacuum pump 200 after suctioning the air out from the vacuum doubling device and generating the negative pressure. In the vacuum pump 200 described above, however, the interior of the housing 203 is intermittently communicated with the atmosphere through the communication groove 210 when the rotor 202 is rotated during the operation of the internal combustion engine. Thus, the air is taken into the vacuum pump 200 through the communication groove 210 even during the operation of the internal combustion engine. The discharging noise of the air thus cannot be reduced.

SUMMARY OF THE INVENTION

In order to solve the problem described above, according to a first aspect of the present invention, an oil supplying path includes an atmosphere communication hole, which supplies air into a negative pressure chamber through the oil supplying path and an oil path when the vacuum pump is stopped. The atmosphere communication hole communicates the negative pressure chamber and the atmosphere before the amount of oil in the housing exceeds an allowable oil amount when the vacuum pump is stopped.

DETAILED DESCRIPTION OF THE PREFERRED EMBODIMENTS

One embodiment of an internal combustion engine will be described below with reference to FIGS. 1 to 12. In the present embodiment, an in-line four cylinder internal combustion engine will be described by way of example.

Figure 1:
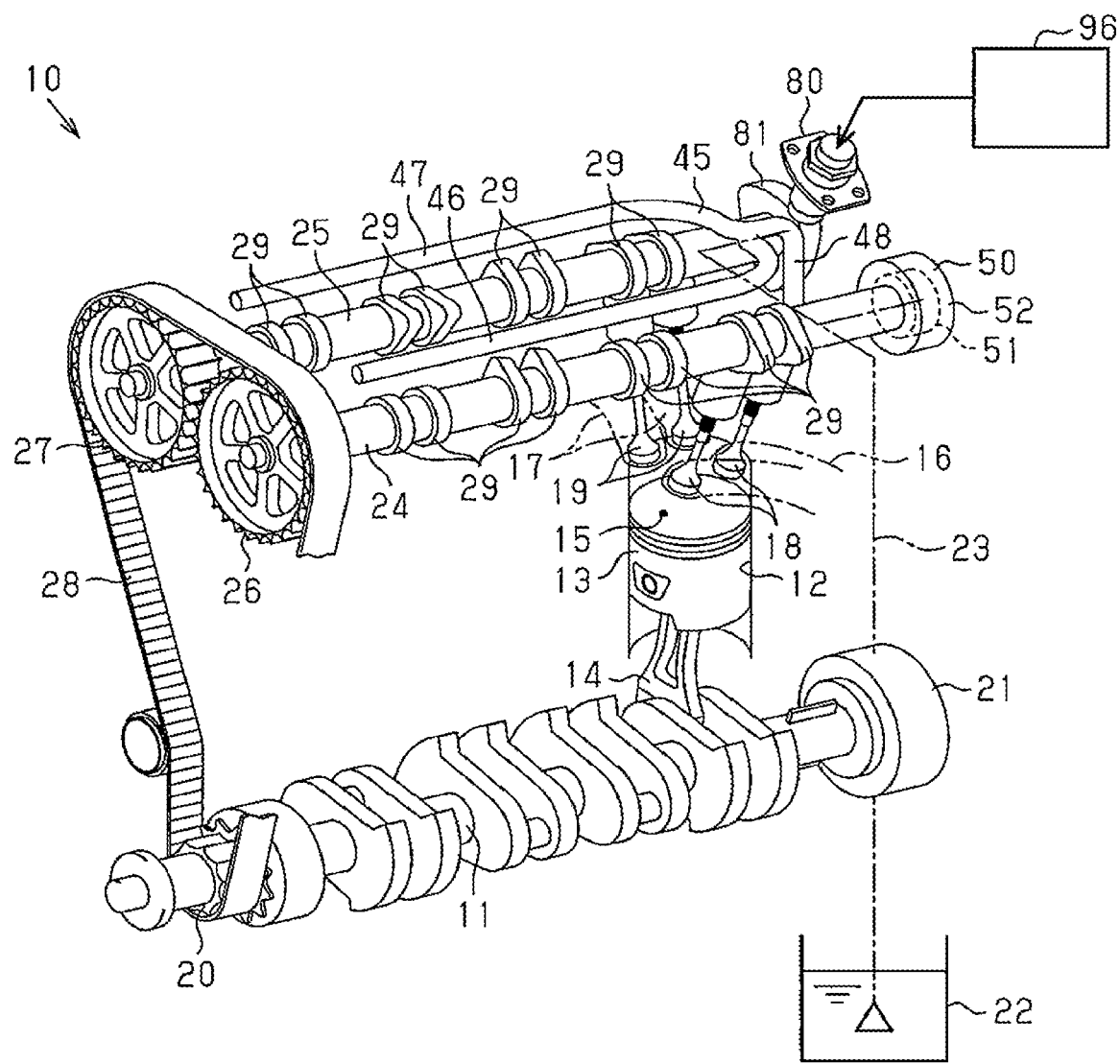
FIG. 1 is a perspective view schematically showing one embodiment of an internal combustion engine.

As shown in FIG. 1, a piston 13 is connected to a crankshaft 11 of an internal combustion engine 10 by way of a connecting rod 14. A cylinder 12 and a combustion chamber 15 are formed in a cylinder block of the internal combustion engine 10. The piston 13 is arranged to reciprocate in the cylinder 12. The combustion chamber 15 is formed by a top surface of the piston 13 and wall surfaces of the cylinder 12 and a cylinder head. An intake passage 16 and an exhaust passage 17 are connected to the combustion chamber 15. The intake passage 16 and the exhaust passage 17 are respectively connected to the combustion chamber 15 while being divided to two ways. An intake valve 18 is arranged at a connecting portion of the intake passage 16 and the combustion chamber 15 to communicate the intake passage 16 and the combustion chamber 15, or to shield such communication. Furthermore, an exhaust valve 19 is arranged at a connecting portion of the exhaust passage 17 and the combustion chamber 15 to communicate the exhaust passage 17 and the combustion chamber 15, or to shield such communication. The intake valve 18 and the exhaust valve 19 are driven by a valve moving mechanism of the internal combustion engine 10.

A crank pulley 20 is connected to one end of the crankshaft 11, and an engine driving type oil pump 21 is connected to the other end of the crankshaft 11. The oil pump 21 is driven accompanying the rotation of the crankshaft 11. The oil pump 21 draws the oil accumulated in an oil pan 22, and discharges the oil to an oil feeding passage 23 in the cylinder head and the cylinder block. The oil feeding passage 23 is connected to each section of the internal combustion engine 10. Thus, after being discharged to the oil feeding passage 23, the oil is supplied to each section of the internal combustion engine 10 to lubricate the sliding area of each section. The oil feeding passage 23 is extended to each section of the valve moving mechanism through the inside of the cylinder head.

A configuration of the valve moving mechanism will now be described in detail.

The valve moving mechanism includes an intake camshaft 24 and an exhaust camshaft 25 arranged in the cylinder head. A timing pulley 26 is connected to one end of the intake camshaft 24, and a timing pulley 27 is connected to one end of the exhaust camshaft 25. A timing belt 28 is wound around each timing pulley 26, 27 and the crank pulley 20. Thus, when the crankshaft 11 is rotated, the intake camshaft 24 and the exhaust camshaft 25 are both rotated in cooperation with the rotation of the crankshaft 11. The intake camshaft 24 has a configuration substantially similar to the exhaust camshaft 25. Therefore, the configuration of the intake camshaft 24 will be described below. The configuration of the exhaust camshaft 25 similar to the intake camshaft 24 is denoted with a common reference numeral, and the description thereof will be omitted.

Figure 2:
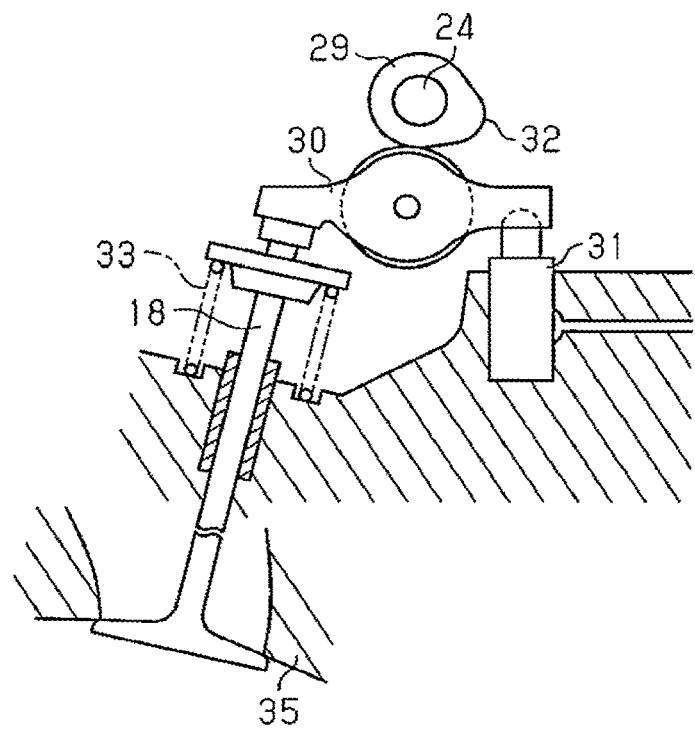
FIG. 2 is a partial cross-sectional view showing, in an enlarged manner, the vicinity of a valve moving mechanism of the internal combustion engine.

As shown in FIG. 1, a plurality of cams 29 is fixed to the intake camshaft 24 and the exhaust camshaft 25. As shown in FIG. 2, the plurality of cams 29 is brought into contact with a rocker arm 30. A left end of the rocker arm 30 is supported by an intake valve 18, and a right end of the rocker arm 30 is supported by a rush adjuster 31. Thus, when the cam 29 is rotated with the intake camshaft 24, the rocker arm 30 is swung with the end supported by the rush adjuster 31 as a supporting point. When a nose portion 32 of the cam 29 pushes the rocker arm 30 downward, the intake valve 18 is pushed down against a biasing force of a valve spring 33. The intake valve 18 is thereby opened, thus communicating the intake passage 16 and the combustion chamber 15. Thereafter, the intake valve 18 is pushed up to a position of making contact with the cylinder head 35 by the biasing force of the valve spring 33. The rocker arm 30 is also pushed up with the intake valve 18. The intake valve 18 is thereby closed, thus shielding the communication of the intake passage 16 and the combustion chamber 15.

Figure 3:
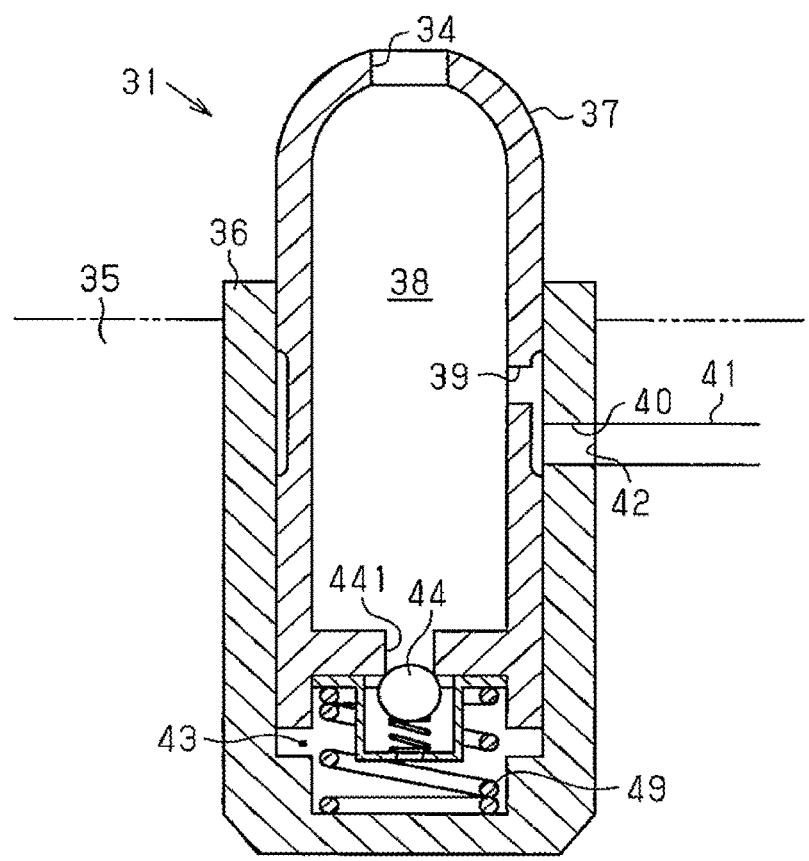
FIG. 3 is a cross-sectional view of a rush adjuster configuring the valve moving mechanism.

As shown in FIG. 3, the rush adjuster 31 includes a bottomed tubular body 36 attached to the cylinder head 35, and a bottomed tubular plunger 37 inserted to the interior of the body 36. The plunger 37 is arranged to be able to reciprocate in an up and down direction, which is the axial direction, of the body 36. A low pressure chamber 38 is formed inside the plunger 37. The low pressure chamber 38 is communicated with a supply hole 40 of the body 36 through a communication hole 39 formed in the plunger 37. An adjuster oil path 41 provided in the cylinder head 35 is connected to the supply hole 40. An opening hole 42 of the adjuster oil path 41 and the low pressure chamber 38 are thereby communicated.

The adjuster oil path 41 is connected to the oil feeding passage 23, and the oil feeding passage 23 is connected to the oil pump 21. The oil discharged from the oil pump 21 is thus supplied to the low pressure chamber 38 of the rush adjuster 31 through the adjuster oil path 41. A flow-out port 34 is provided at the top part of the plunger 37. The redundant oil of the oil supplied to the low pressure chamber 38 is discharged to the outside through the flow-out port 34.

The rush adjuster 31 also includes a high pressure chamber 43 defined by the bottom part of the plunger 37 and the inner wall of the body 36. A valve hole 441, which is opened and closed by a check valve 44, is formed at the bottom part of the plunger 37. When the check valve 44 is opened, the low pressure chamber 38 and the high pressure chamber 43 are communicated, so that the oil flows in from the low pressure chamber 38 into the high pressure chamber 43.

A spring 49 is arranged in the high pressure chamber 43 to bias the plunger 37 upward, which is a direction of projecting out from the body 36. Thus, the right end of the rocker arm 30 is constantly biased upward by the top part of the plunger 37. The left end of the rocker ram 30 is also constantly biased upward by the action of the valve spring 33 of the intake valve 18. The rocker ram 30 is thereby pushed against the cam 29, whereby the clearance between the cam 29 and the rocker arm 30 is adjusted to zero even if the cam 29 and the rocker arm 30 are worn.

Furthermore, when the plunger 37 is further projected out from the body 36 by the biasing force of the spring 49 to adjust the clearance to zero, the capacity of the high pressure chamber 43 increases and hence the inner pressure of the high pressure chamber 34 lowers. The check valve 44 is thus opened, and the oil flows in from the low pressure chamber 38 into the high pressure chamber 43. When the oil of an amount corresponding to the amount of increase in the capacity of the high pressure chamber 43 flows in from the low pressure chamber 38 into the high pressure chamber 43, the check valve 44 is closed. If a load acts on the plunger 37 through the rocker arm 30 in such a state by the rotation of the cam 29, the pushing in of the plunger 37 by the rotation of the cam 29 is regulated and the position of the plunger 37 is maintained by the oil of the high pressure chamber 43. As a result, the intake valve 18 is opened/closed according to a predetermined lift profile corresponding to the shape of the nose portion 32 of the cam 29. Therefore, the rush adjuster 31 is a hydraulic rush adjuster that adjusts the clearance of the cam 29 and the rocker arm 30 using oil pressure. The rush adjuster 31 having a configuration similar to the configuration described above is also brought into contact with the rocker arm 30 in contact with each cam 29 arranged in the exhaust camshaft 25.

As shown in FIG. 1, a cam shower pipe 45 that supplies oil to each camshaft 24, 25 is arranged in the internal combustion engine 10. The cam shower pipe 45 includes an intake side shower pipe 46 that is located above the intake camshaft 24 and extended in an axial direction of the camshaft 24, and an exhaust side shower pipe 47 that is located above the exhaust camshaft 25 and extended in the axial direction of the camshaft 25. The respective one ends of the shower pipes 46, 47 are connected to each other to configure a merged tube part 48. The intake side shower pipe 46 and the exhaust side shower pipe 47 are connected to each other at a position close to the intake side shower pipe 46. The merged tube part 48 is connected to the upper surface of the cylinder head 35. The oil feeding passage 23 is connected to a connecting portion of the upper surface of the cylinder head 35 and the merged tube part 48. Thus, the oil is supplied to the cam shower pipe 45 through the oil feeding passage 23. A plurality of opening holes is formed in the intake side shower pipe 46 to be lined in the axial direction facing the intake camshaft 24. A plurality of opening holes is formed in the exhaust side shower pipe 47 to be lined in the axial direction facing the exhaust camshaft 25. The oil supplied to the intake side shower pipe 46 is discharged from each opening hole of the intake side shower pipe 46 and supplied to the intake camshaft 24. The oil supplied to the exhaust side shower pipe 47 is discharged from each opening hole of the exhaust side shower pipe 47 and supplied to the exhaust camshaft 25. Each camshaft 24, 25 is thereby lubricated.

A vacuum pump 50 is arranged at the end of the intake camshaft 24. The vacuum pump 50 includes a rotor 51 and a housing 52 that accommodates the rotor 51. The rotor 51 is coupled to the intake camshaft 24 to integrally rotate with the camshaft 24. The housing 52 rotatably supports the rotor 51.

The configuration of the vacuum pump 50 will now be described below with reference to FIGS. 4 to 6.

Figure 4:
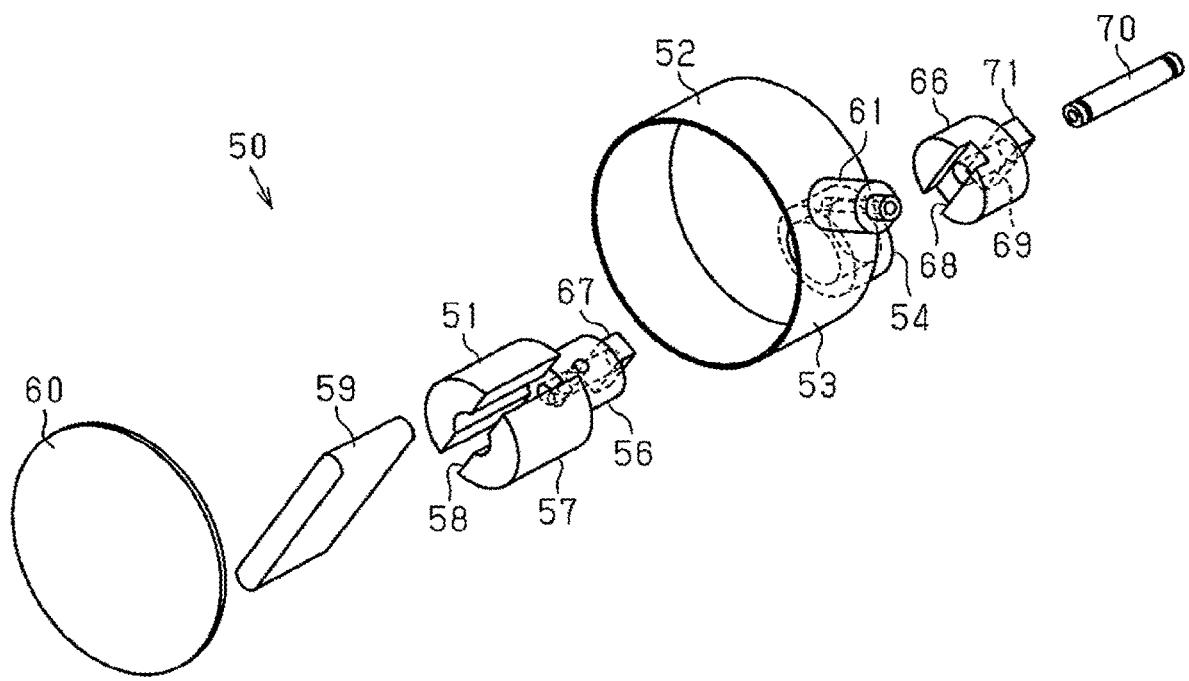
FIG. 4 is an exploded perspective view showing a vacuum pump of the internal combustion engine.

As shown in FIG. 4, the vacuum pump 50 includes a tubular housing 52. The housing 52 includes an accommodating part 53 and a supporting part 54 having a smaller diameter than the accommodating part 53. The cross-section of the accommodating part 53 is a substantially elliptical shape, and the cross-section of the supporting part 54 is a circular shape. The supporting part 54 is arranged to be decentered with respect to the accommodating part 53. As shown in FIG. 6, the housing 52 is fixed to a supporting wall 55 arranged in the cylinder head 35.

As shown in FIG. 4, a circular column shaped rotor 51 is accommodated in the housing 52. The rotor 51 includes a shaft part 56, and a sliding part 57 having a greater diameter than the shaft part 56. The shaft part 56 is rotatably supported by being inserted to the supporting part 54 of the housing 52. A sliding groove 58, which extends in a radial direction, is formed in the sliding part 57. A vane 59 is assembled to the sliding groove 58. The vane 59 is slidable in the radial direction of the rotor 51 along the sliding groove 58.

The vacuum pump 50 has a cover 60 having substantially the same shape as the cross-section of the accommodating part 53 of the housing 52. The cover 60 is attached to an open end of the housing 52 with the vane 59 and the rotor 51 accommodated inside the housing 52.

Figure 5:
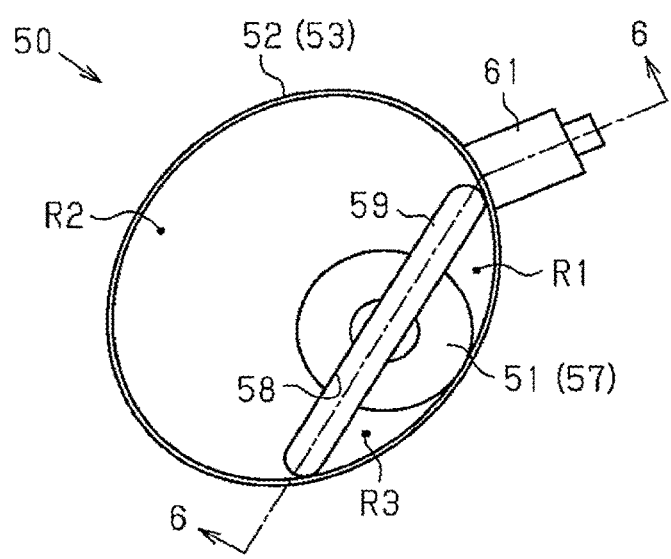
FIG. 5 is a front view showing a state in which a cover is detached from the vacuum pump.

As shown in FIG. 5, in a state the rotor 51 and the vane 59 are assembled to the housing 52, the interior of the accommodating part 53 of the housing 52 is sectionalized into spaces R1, R2, and R3 by the rotor 51 and the vane 59. The center axis of the rotor 51 substantially overlaps the center axis of the supporting part 54. The rotor 51 is arranged to be decentered with respect to the accommodating part 53. Furthermore, since the cross-section of the accommodating part 53 is a substantially elliptical shape, when the rotor 51 and the vane 59 are rotated in the housing 52, the vane 59 is slidably moved in the sliding groove 58 while bringing both ends into contact with the inner wall of the accommodating part 53, thus changing the capacity of each space R1, R2, and R3.

Under the state shown in FIG. 5, a suction port 61, which communicates the interior of the housing 52 and the interior of the vacuum doubling device of the brake, is arranged at a boundary portion of the space R1 and the space R2 in the housing 52. Thus, when the rotor 51 is rotated in the counterclockwise direction from the state shown in FIG. 5, the space R1 is communicated with the space in the vacuum doubling device of the brake. Accompanying the rotation of the rotor 51, the capacity of the space R1 is increased and the negative pressure is generated in the space R1. The negative pressure generated in the space R1 causes the air in the vacuum doubling device to be suctioned into the space R1 through the suction port 61. The negative pressure is thereby generated in the vacuum doubling device.

Furthermore, when the rotor 51 is rotated in the counterclockwise direction from the state shown in FIG. 5, the communication of the space R2 and the suction port 61 is shielded. Accompanying the rotation of the rotor 51, the capacity of the space R2 is reduced and the air in the space R2 is compressed. As shown in FIG. 6, an air discharge port 62 is also provided in the housing 52. The discharge port 62 is connected to the space R3 in the state shown in FIG. 5. Thus, in the course of the rotor 51 rotating in the counterclockwise direction in FIG. 5 and the capacity of the space R3 reducing, the compressed air in the space R3 is discharged through the discharge port 62.

Thus, in the vacuum pump 50, an intake stroke (space R1 of FIG. 5) of taking in air, a compression stroke (space R2 of FIG. 5) of compressing the air taken in, and a discharge stroke (space R3 of FIG. 5) of discharging the compressed air are repeated by rotating the rotor 51, thus generating the negative pressure. In other words, when the vacuum pump 50 is driven, the intake stroke, the compression stroke, and the discharge stroke are respectively repeated in the spaces R1, R2, R3 of the housing 52. The spaces R1, R2, and R3 in the housing 52 thus become negative pressure chambers that generate the negative pressure.

Figure 6:
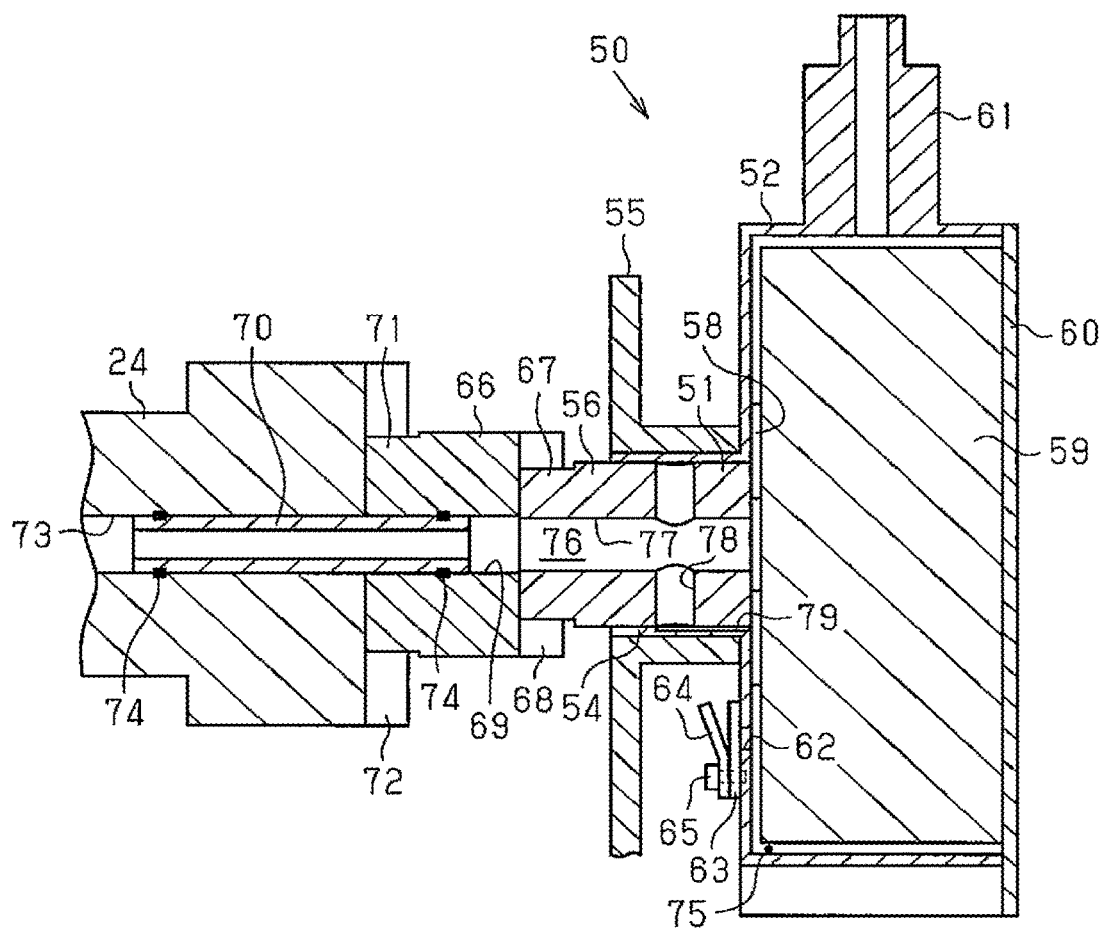
FIG. 6 is a cross-sectional view taken along line 6-6 of FIG. 5.

As shown in FIG. 6, a lead valve 63 is arranged at the discharge port 62. The lead valve 63 is, for example, a plate-shaped member made of metal that blocks the discharge port 62. The lead valve 63 is fixed to the housing 52 with a bolt 65, with a stopper member 64 overlapped on the lead valve 63. The stopper member 64 is bent to separate away from the lead valve 63 toward the upper side. Thus, with a portion sandwiched by the housing 52 and the stopper member 64 as a supporting point, the lead valve 63 is configured such that the portion on the side opposite to the supporting point can be elastically deformed toward the stopper member 64.

Therefore, when the air in the space communicated with the discharge port 62 among the spaces R1, R2, and R3 is compressed and the pressure in the space is increased, the upper end of the lead valve 63 is deformed until making contact with the stopper member 64. The discharge port 62 is thereby opened. On the other hand, when the air in the space is discharged and the pressure in the space is reduced, the lead valve 63 is returned to the original position. The discharge port 62 is thereby closed. As described above, the air is discharged from the housing 52 through the discharge port 62, and the air is suppressed from flowing in from the discharge port 62 into the housing 52.

A circular column shaped coupling 66 is coupled to the shaft part 56 of the rotor 51. As shown in FIG. 4, a rectangular projection 67 is projected out from the shaft part 56 of the rotor 51. The coupling 66 is formed with a groove 68 having substantially the same shape as the projection 67. Thus, the rotor 51 and the coupling 66 are coupled by inserting and locking the projection 67 of the rotor 51 in the groove 68 of the coupling 66. An insertion path 69, which extends in the axial direction, is formed inside the coupling 66.

As shown in FIGS. 4 and 6, the intake camshaft 24 is coupled to the coupling 66 with the oil feeding pipe 70 inserted thereto. The coupling 66 has a rectangular protrusion 71 at the end where the oil feeding pipe 70 is inserted. A groove 72 having substantially the same shape as the protrusion 71 is formed at the end of the intake camshaft 24. Thus, the coupling 66 and the intake camshaft 24 are coupled by inserting and locking the protrusion 71 of the coupling 66 in the groove 72 of the intake camshaft 24. The rotor 51 is thereby coupled to the intake camshaft 24 by way of the coupling 66.

An oil feeding hole 73, which extends in the axial direction, is formed in the intake camshaft 24. The oil feeding hole 73 is connected to the oil feeding passage 23. The oil feeding hole 73 is connected to the oil pump 21 through the oil feeding passage 23. The oil feeding pipe 70 inserted into the insertion path 69 of the coupling 66 is also inserted into the oil feeding hole 73 of the intake camshaft 24. An O-ring 74 is attached to the outer peripheral surface of each end of the oil feeding pipe 70. The O-rings 74 respectively seals the gap between the oil feeding pipe 70 and the coupling 66, and the oil feeding pipe 70 and the intake camshaft 24.

As shown in FIG. 6, the vacuum pump 50 is formed with an oil path 76 that is communicated to the negative pressure chamber 75 to supply oil to the sliding portions such as the vane 59, the rotor 51, and the like. The negative pressure chamber 75 is the spaces R1, R2, and R3 described above. The oil path 76 includes the insertion path 69 of the coupling 66, and is communicated with the oil feeding hole 73 of the intake camshaft 24 through the oil feeding pipe 70.

A first oil path 77 extending in the axial direction and a second oil path 78 extending in the radial direction orthogonal to the first oil path 77 are arranged in the shaft part 56 of the rotor 51. The left end of the first oil path 77 is connected to the insertion path 69 of the coupling 66, and the right end of the first oil path 77 is connected to the sliding groove 58 of the rotor 51. The second oil path 78 is passed through the shaft part 56 in the radial direction.

An oil feeding groove 79, which communicates with the negative pressure chamber 75, is formed in the supporting part 54 of the housing 52. The oil feeding groove 79 is extended to a position facing the second oil path 78 of the rotor 51 along the axial direction. Thus, as in the state shown in FIG. 6, when the second oil path 78 and the oil feeding groove 79 are communicated accompanying the rotation of the rotor 51, the first oil path 77 is connected to the negative pressure chamber 75 through the oil feeding groove 79. Therefore, after being supplied to the oil feeding hole 73 through the oil feeding passage 23, the oil is supplied to the negative pressure chamber 75 through the oil path 76 of the vacuum pump 50.

Figure 7:
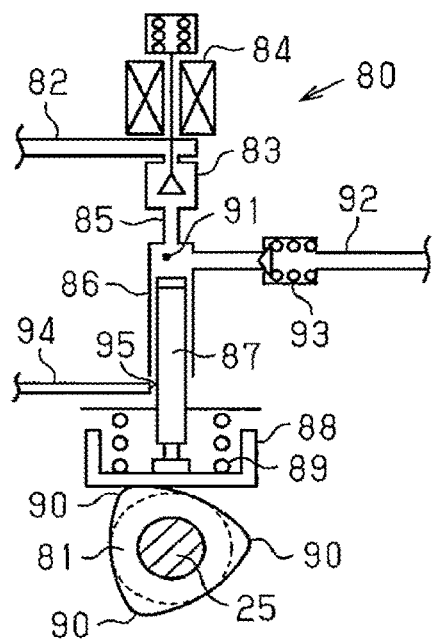
FIG. 7 is a schematic view showing a high pressure fuel pump of the internal combustion engine.

As shown in FIG. 1, a drive cam 81 for driving a fuel pump 80 is arranged at the end of the exhaust camshaft 25. As shown in FIG. 7, the fuel pump 80 includes an introducing chamber 83. A low pressure fuel passage 82 is connected to the introducing chamber 83. The fuel pumped up from the fuel tank with a feed pump is supplied to the low pressure fuel passage 82. An electromagnetic valve 84 is arranged at the connecting portion of the low pressure fuel passage 82 and the introducing chamber 83. A cylinder 86 is connected to the introducing chamber 83 by way of an introducing path 85. A plunger 87 is accommodated in the cylinder 86 in a manner slidable in the up and down direction. A lifter 88 is fixed to the basal end of the plunger 87.

The lifter 88 is biased in a direction of lowering the plunger 87 by a spring 89. The lifter 88 is also brought into contact with the drive cam 81 fixed to the exhaust camshaft 25. The drive cam 81 includes a nose portion 90. Accompanying the rotation of the drive cam 81, the nose portion 90 pushes up the lifter 88, and raises the plunger 87 against the biasing force of the spring 89. Thereafter, the lifter 88 is pushed down by the biasing force of the spring 89, and lowers the plunger 87. The plunger 87 is thus periodically moved up and down in the cylinder 86 with the rotation of the drive cam 81.

A high pressure fuel passage 92 is connected to a pressurization chamber 91, which is defined by a distal end of the plunger 87 and the inner wall of the cylinder 86. The high pressure fuel passage 92 includes a discharge valve 93. The discharge valve 93 discharges the fuel from the pressurization chamber 91 to the high pressure fuel passage 92, and regulates the backflow of the fuel from the high pressure fuel passage 92 to the pressurization chamber 91.

The oil is supplied to the fuel pump 80 through a pump oil path 94. The pump oil path 94 includes an opening hole 95 opened toward the side surface of the plunger 87. The oil supplied from the pump oil path 94 lubricates the sliding portion of the cylinder 86 and the plunger 87.

As shown in FIG. 1, a control device 96 for controlling the electromagnetic valve 84 of the fuel pump 80 is arranged in the internal combustion engine 10. The control device 96 controls the electromagnetic valve 84 in the following manner to pressure feed the fuel from the fuel pump 80.

The control device 96 opens the electromagnetic valve 84 as shown in FIG. 7 when the plunger 87 is lowered. The fuel is thereby suctioned into the pressurization chamber 91 of the fuel pump 80 from the low pressure fuel passage 82. The control device 96 then closes the electromagnetic valve 84 under a state the fuel is suctioned into the fuel pump 80. The plunger 87 is thereby raised, whereby the fuel in the pressurization chamber 91 is pressurized. When the fuel pressure in the pressurization chamber 91 becomes higher than the valve opening pressure of the discharge valve 93, the discharge valve 93 is opened to discharge the fuel to the high pressure fuel passage 92. After the fuel is discharged, the fuel pressure in the pressurization chamber 91 is lowered, and hence the discharge valve 93 is closed and the backflow of the fuel from the high pressure fuel passage 92 to the fuel pump 80 is regulated. The fuel pressure fed from the fuel pump 80 is then supplied to a fuel injection valve, and injected from the fuel injection valve to the combustion chamber 15.

Figure 8:
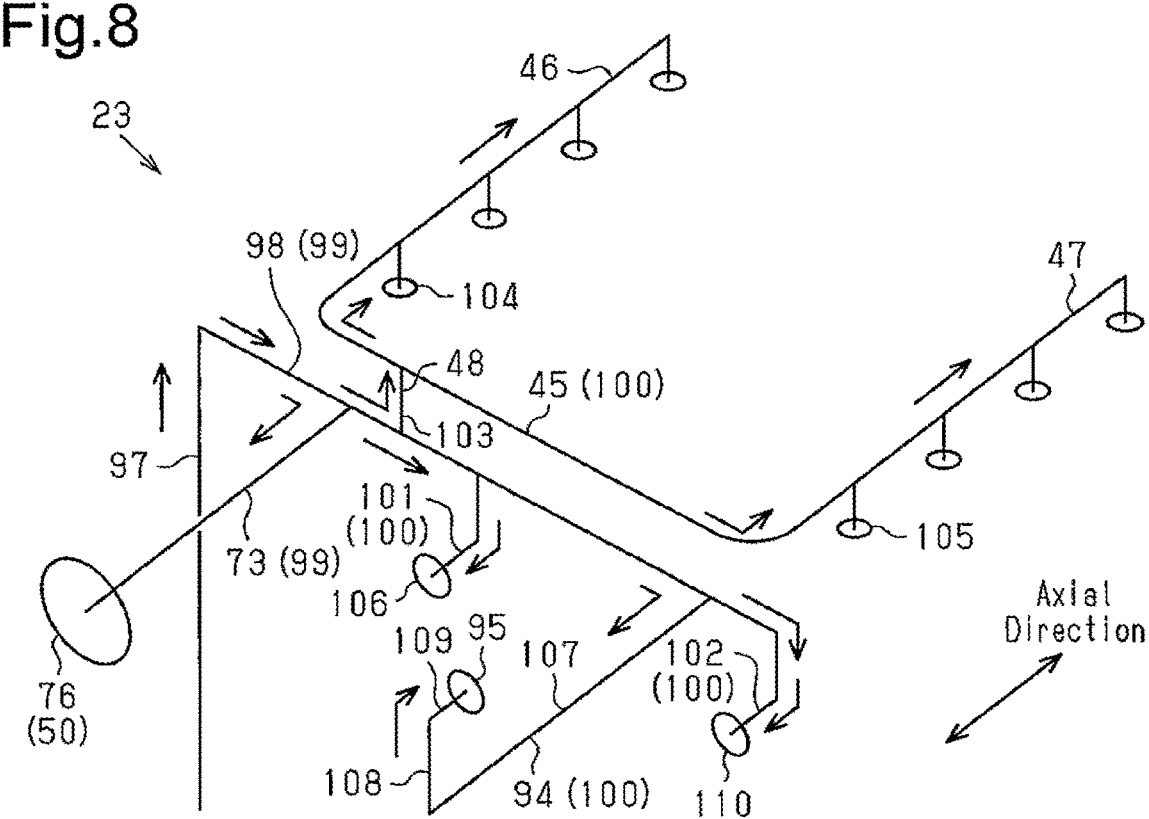
FIG. 8 is a schematic view showing an oil feeding path of the internal combustion engine.

The flow of oil supplied to each section of the internal combustion engine 10 through the oil feeding passage 23 will now be described with reference to FIG. 8. FIG. 8 schematically shows one part of the oil feeding passage 23 formed inside the cylinder head 35.

As shown in FIG. 8, the oil feeding passage 23 includes a longitudinal oil path 97 extending toward the upper side in the cylinder head 35 and a transverse oil path 98 connected to the upper part of the longitudinal oil path 97. The transverse oil path 98 is extended in the direction orthogonal to the shaft line of each camshaft 24, 25 at the upper part of the cylinder head 35. The oil feeding hole 73 of the intake camshaft 24 is connected to the transverse oil path 98. The transverse oil path 98 and the oil feeding hole 73 configure a merging path 99.

A plurality of branched paths 100 is branched from the transverse oil path 98. The branched path 100 includes the cam shower pipe 45, a first adjuster oil path 101, the pump oil path 94, and a second adjuster oil path 102.

The transverse oil path 98 includes a connecting passage 103 in the vicinity of the connecting portion of the transverse oil path 98 and the oil feeding hole 73, which connecting passage 103 extends from the transverse oil path 98 to the upper surface of the cylinder head 35 through the cylinder head 35. The connecting passage 103 is connected to the merged tube part 48 of the cam shower pipe 45. An opening hole closest to the merged tube part 48 of the plurality of opening holes formed in the intake side shower pipe 46 is defined as a first opening hole 104. An opening hole closest to the merged tube part 48 of the plurality of opening holes formed in the exhaust side shower pipe 47 is defined as a second opening hole 105.

In the transverse oil path 98, the first adjuster oil path 101 is connected to a position spaced apart from the longitudinal oil path 97 than the connecting portion of the transverse oil path 98 and the connecting passage 103. The first adjuster oil path 101 is extended toward the lower side from the transverse oil path 98 and the lower part of the first adjuster oil path 101 is bent in the axial direction of the camshaft 24, 25. The first adjuster oil path 101 is connected to the rush adjuster 31 most proximate to the end of the intake camshaft 24, to which the vacuum pump 50 is connected, of the rush adjusters 31 for adjusting the clearance of the cam 29 of the intake camshaft 24 and the rocker arm 30. An opening hole 106 for supplying oil to the rush adjuster 31 is formed at the distal end of the first adjuster oil path 101.

In the transverse oil path 98, the pump oil path 94 is connected to a position spaced apart from the longitudinal oil path 97 than the connecting portion of the transverse oil path 98 and the first adjuster oil path 101. The pump oil path 94 includes a first passage 107 extending in the axial direction of each camshaft 24, 25 from the transverse oil path 98, a second passage 108 extending toward the upper side from the first passage 107, and a third passage 109 extending in the axial direction of each camshaft 24, 25 to return from the second passage 108 to the transverse oil path 98. An opening hole 95 for supplying oil to the fuel pump 80 is formed at the distal end of the pump oil path 94.

The second adjuster oil path 102 is connected to the distal end of the transverse oil path 98. The second adjuster oil path 102 is extended toward the lower side from the distal end of the transverse oil path 98, and the lower part of the second adjuster oil path 102 is bent in the axial direction of the camshaft 24, 25. The second adjuster oil path 102 is connected to the rush adjuster 31 most proximate to the end of the exhaust camshaft 25, where the drive cam 81 is arranged, of the rush adjusters 31 for adjusting the clearance of the cam 29 of the exhaust camshaft 25 and the rocker arm 30. An opening hole 110 for supplying oil to the rush adjuster 31 is formed at the distal end of the second adjuster oil path 102.

As shown with arrows in FIG. 8, in the oil feeding passage 23, the oil pumped up from the oil pump 21 is moved to the upper part of the cylinder head 35 through the longitudinal oil passage 97. The oil is then supplied into the transverse oil path 98, and supplied to the oil path 76 of the vacuum pump 50 through the oil feeding hole 73. In other words, the oil is supplied to the oil path 76 of the vacuum pump 50 through the merging path 99 configured from the transverse oil path 98 and the oil feeding hole 73. The oil that did not flow to the oil feeding hole 73 of the oil supplied to the transverse oil path 98 flows into the cam shower pipe 45, the first adjuster oil path 101, the pump oil path 94, and the second adjuster oil path 102 through the branched path 100 branched from the transverse oil path 98. Thus, the oil is supplied to each section of the internal combustion engine 10 such as each camshaft 24, 25, the rush adjuster 31, and the fuel pump 80. The merging path 99 and each branched path 100 are connected to the oil pump 21, thus configuring an oil supplying path that supplies oil to the oil path 76 of the vacuum pump 50.

In the oil supplying path, the distance from the first opening hole 104 of the cam shower pipe 45 to the oil path 76 is the shortest of the distances from each of the opening holes to the oil path 76 of the vacuum pump 50.

Figure 9:
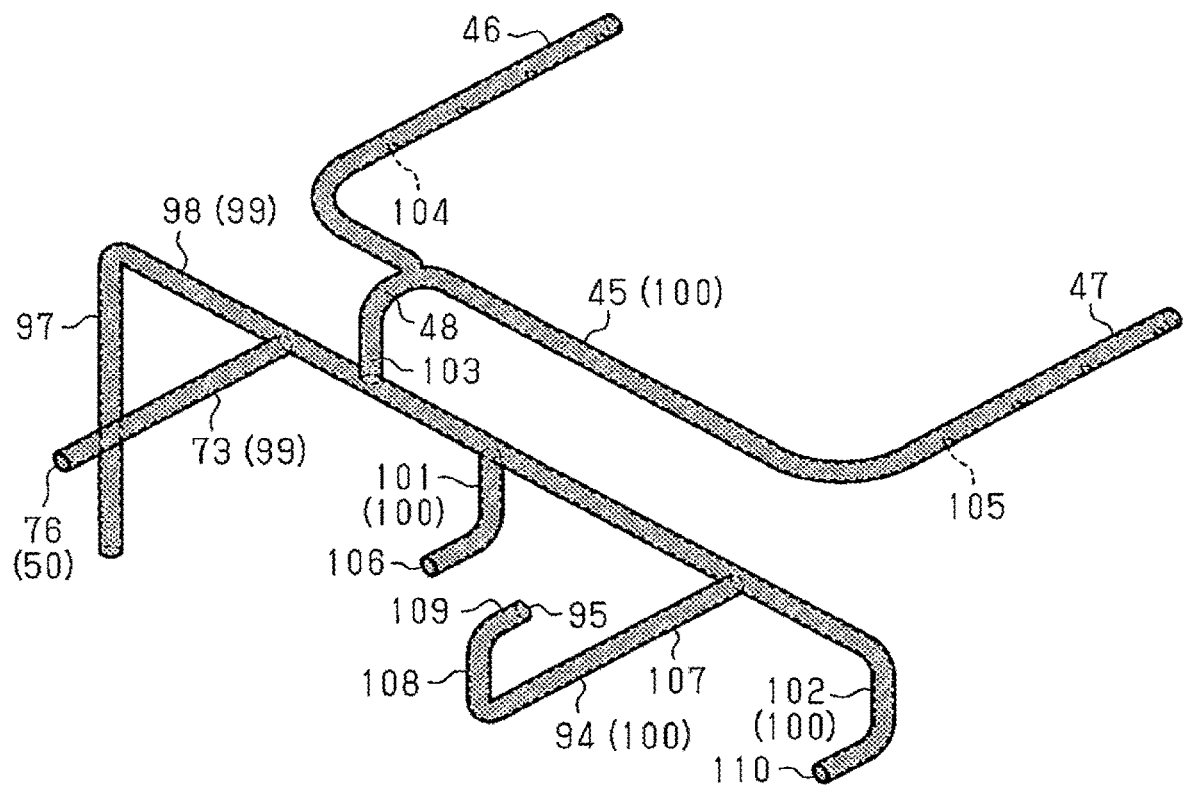
FIG. 9 is a perspective view showing a state in which the oil feeding path is filled with oil.

As shown in FIG. 9, in the operation state of the internal combustion engine 10, the oil pump 21 is driven, and hence the oil supplying path is filled with oil. Thus, the communication of the opening hole of each branched path 100 and the negative pressure chamber 75 of the vacuum pump 50 is shielded. In the present embodiment, the capacity of the oil supplying path, that is, the total capacity, which is the sum of the capacity of the merging path 99 and the capacity of each branched path 100, is the same as the allowable oil amount of the vacuum pump 50.

When the operation of the internal combustion engine 10 is stopped and the drive of the vacuum pump 50 is stopped under a state the oil supplying path is filled with oil, the oil is taken into the vacuum pump 50 from the oil supplying path by the negative pressure in the negative pressure chamber 75 of the vacuum pump 50.

The allowable oil amount is set to a maximum oil amount at which the resistance that acts on the vane 59 when the vacuum pump 50 is driven does not break the vane 59. The maximum oil amount can be obtained in advance through verification experiments from the relationship of the oil amount remaining in the vacuum pump 50 and the presence/absence of breakage of the vane 59 of when the vacuum pump 50 is driven. The passage cross-sectional area and the length of the merging path 99 and each branched path 100 are respectively set based on the obtained maximum oil amount, so that the total capacity becomes the same as the allowable oil amount. In the present embodiment, the total capacity is designed to be the same as the allowable oil amount of the vacuum pump 50 by making the passage cross-sectional areas of the merging path 99 and each branched path 100 the same and adjusting the length of each branched path 100.

Now, a flow of the oil in the oil supplying path of when the vacuum pump 50 is stopped will be described with reference to FIGS. 10 to 12.

Figure 10:
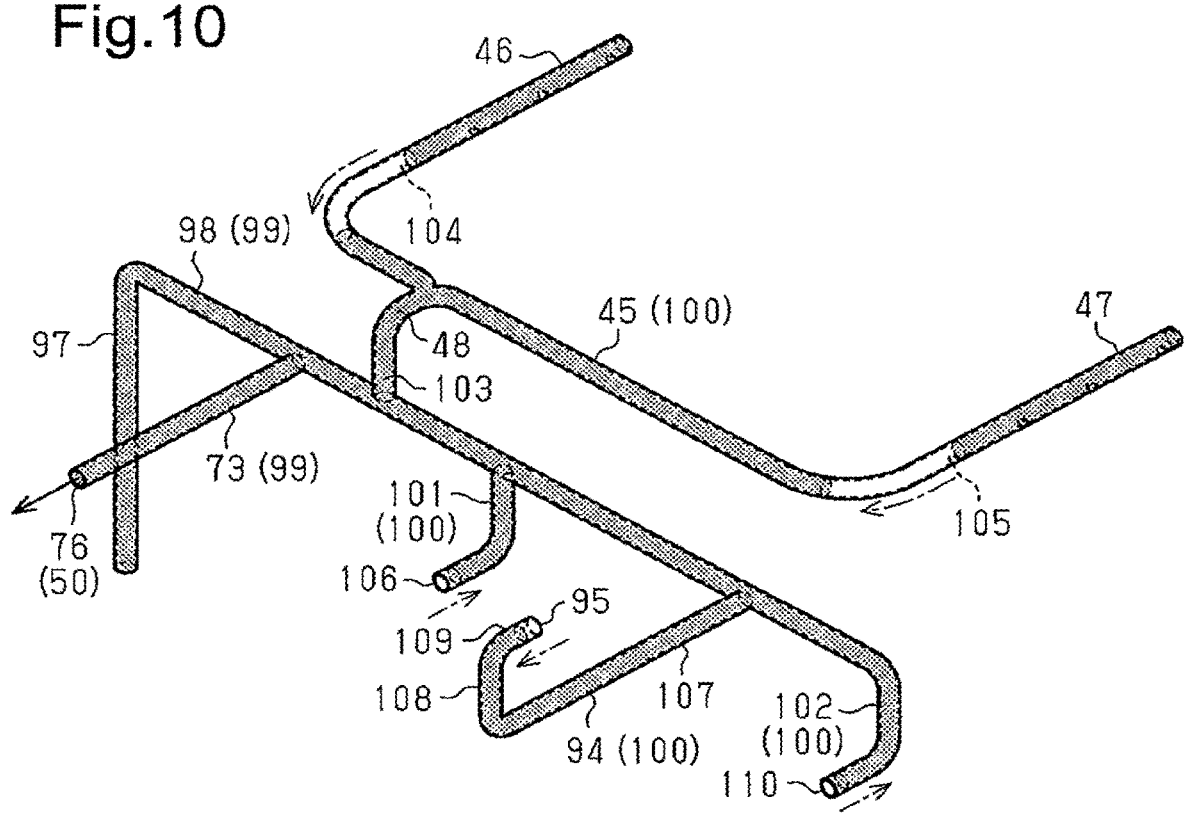
FIG. 10 is a perspective view showing a flow of oil in the oil feeding path of when the vacuum pump is stopped.
Figure 11:
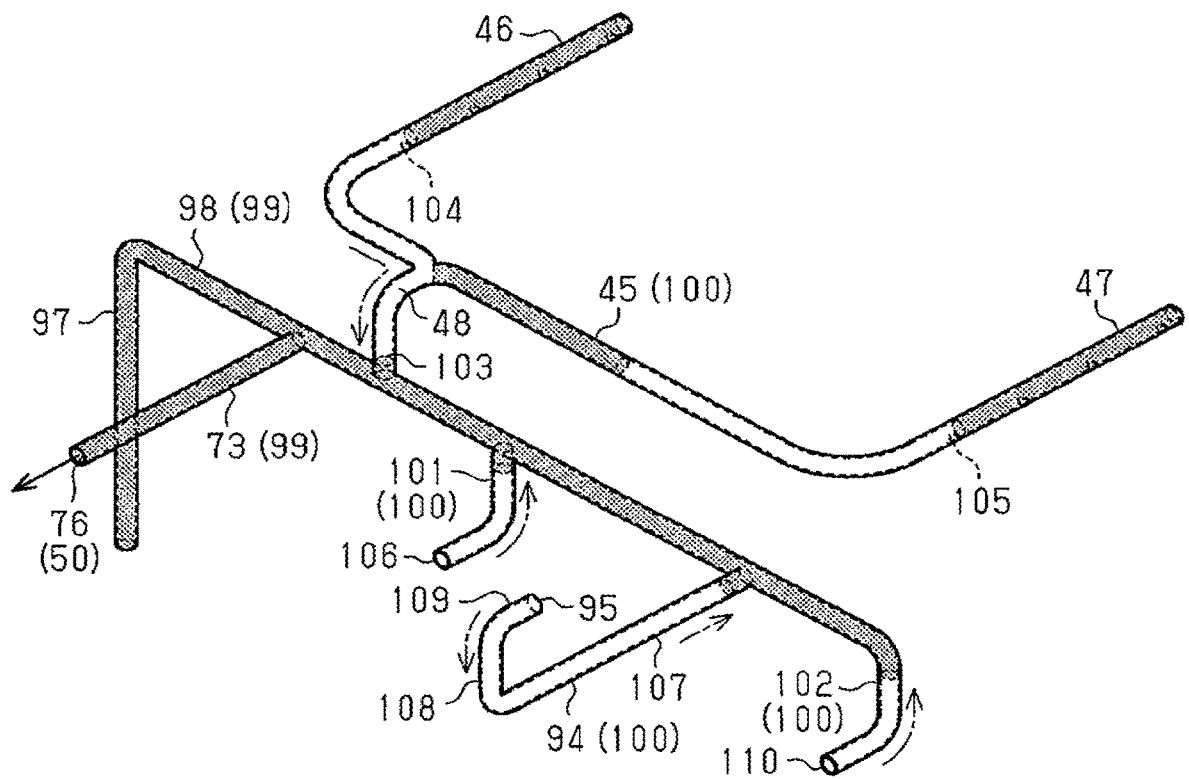
FIG. 11 is a perspective view showing a flow of oil in the oil feeding path of after a predetermined time has elapsed from when the vacuum pump is stopped.

As shown in FIG. 10, when the vacuum pump 50 is stopped, the oil is taken into the negative pressure chamber 75 by the negative pressure remaining in the negative pressure chamber 75. The opening holes 95, 104, 105, 106, 110 communicating to the atmosphere are arranged in each branched path 100. Thus, accompanying the oil in the oil supplying path being suctioned into the vacuum pump 50, the air is taken into the oil supplying path through the opening holes 95, 104, 105, 106, 110. Although an opening hole is also formed in the longitudinal oil path 97, the opening hole of the longitudinal oil path 97 is arranged at a position spaced distant from the oil path 76 of the vacuum pump 50 compared to the opening holes 95, 104, 105, 106, 110 of the oil supplying path. Thus, the amount of oil suctioned from the longitudinal oil path 97 is extremely small, and the flow of oil can be ignored.

The merged tube part 48 of the cam shower pipe 45 is proximate to the intake side shower pipe 46 than the exhaust side shower pipe 47. Thus, as shown in FIG. 11, in the cam shower pipe 45, the air taken in from the first opening hole 104 reaches the merged tube part 48 faster than the air taken in from the second opening hole 105. Thus, when the air taken in from one shower pipe 46 of the shower pipes 46, 47 reaches the merged tube part 48, the negative pressure of the vacuum pump 50 does no longer acts on the other shower pipe 47. The suction of oil from the exhaust side shower pipe 47 is thus stopped.

Figure 12:
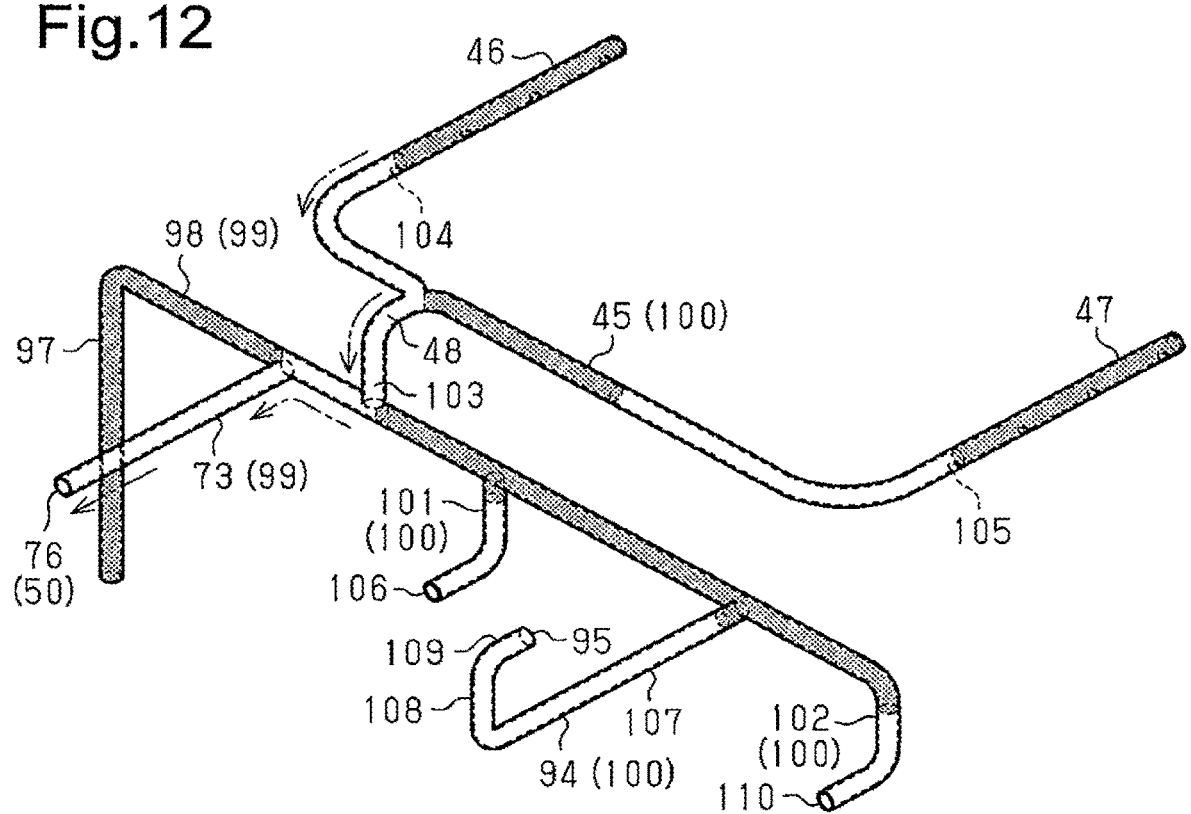
FIG. 12 is a perspective view showing a state in the oil feeding path of when the air is supplied to the vacuum pump through an opening hole of a cam shower pipe.

As shown in FIG. 12, the first opening hole 104 is communicated with the vacuum pump 50 the fastest since the distance to the oil path 76 of the vacuum pump 50 is close compared to the other opening holes 95, 105, 106, 110. When the first opening hole 104 is communicated with the negative pressure chamber 75 of the vacuum pump 50, the air is supplied into the negative pressure chamber 75 through the passage extending from the first opening hole 104 to the oil path 76 of the vacuum pump 50. The negative pressure remaining in the negative pressure chamber 75 of the vacuum pump 50 is thereby consumed.

Under a state the vacuum pump 50 and the atmosphere are communicated as described above, the negative pressure in the vacuum pump 50 does not act on the oil remaining in the other branched paths 100. Thus, the oil remaining in the other branched paths 100 will not be further suctioned. The amount of oil in the vacuum pump 50 is thereby suppressed to smaller than or equal to the total capacity of the oil supplying path, that is, the allowable oil amount. Therefore, the first opening hole 104 of the cam shower pipe 45 functions as an atmosphere communication hole that communicates the negative pressure chamber 75 and the atmosphere before the amount of oil in the housing 52 exceeds the allowable oil amount when the vacuum pump 50 is stopped.

The operation of the internal combustion engine 10 will now be described.

When the vacuum pump 50 is stopped, the oil is taken into the vacuum pump 50 by the negative pressure remaining in the negative pressure chamber 75. In this regard, according to the present embodiment, the negative pressure chamber 75 and the atmosphere are communicated before the amount of oil in the housing 52 exceeds the allowable oil amount of the vacuum pump 50, and thus, the oil will not be further taken in after the negative pressure chamber 75 and the atmosphere are communicated. The oil amount in the housing 52 thus can be suppressed to smaller than or equal to the allowable oil amount. The oil of an amount of breaking the vane 59 thus can be prevented from being taken into the vacuum pump 50.

When the vacuum pump 50 is driven, the oil supplying path is filled with oil accompanying the drive of the oil pump 21. Thus, the communication of the first opening hole 104 serving as the atmosphere communication hole and the negative pressure chamber 75 of the vacuum pump 50 is shielded by the oil. The communication of the other opening holes and the negative pressure chamber 75 of the vacuum pump 50 is also shielded similar to the above. Thus, the amount of air taken into the vacuum pump 50 is suppressed during the drive of the vacuum pump 50. The amount of air discharged from the vacuum pump 50 thus can be suppressed.

The total capacity, which is the sum of the capacity of the merging path 99 and the capacity of each branched path 100, is set to be the same as the allowable oil amount, so that even if the oil in the merging path 99 and the oil in each branched path 100 are all taken into the housing 52 by the negative pressure in the negative pressure chamber 75, the amount of oil in the housing 52 is suppressed to smaller than or equal to the allowable oil amount. The atmosphere communication hole does not need to be separately arranged by arranging the cam shower pipe 45 as the branched path 100 and causing the first opening hole 104 of the cam shower pipe 45 to function as the atmosphere communication hole. The manufacturing of the internal combustion engine 10 is thus facilitated.

The present embodiment has the following effects.

(1) The first opening hole 104 serving as the atmosphere communication hole is arranged in the oil supplying path. When the vacuum pump 50 is stopped, the negative pressure chamber 75 and the atmosphere are communicated by the first opening hole 104 before the amount of oil in the housing 52 exceeds the allowable oil amount. Thus, the amount of oil taken in when the vacuum pump 50 is stopped is suppressed to smaller than or equal to the allowable oil amount. When the vacuum pump 50 is being driven, the communication of each opening hole and the negative pressure chamber 75 is shielded by the oil in the oil supplying path. Thus, the amount of air taken into the vacuum pump 50 is suppressed. Therefore, the oil is suppressed from being taken into the vacuum pump 50 thus breaking the vacuum pump 50 while the operation of the internal combustion engine is stopped, and the air is suppressed from being discharged from the vacuum pump 50 thus generating noise during the operation of the internal combustion engine.

(2) The total capacity, which is the sum of the capacity of the merging path 99 and the capacity of each branched path 100, is set to be the same as the allowable oil amount, so that the amount of oil in the housing 52 does not exceed the allowable oil amount.

(3) The atmosphere communication hole does not need to be separately arranged by causing the first opening hole 104 of the cam shower pipe 45 of the internal combustion engine 10 to function as the atmosphere communication hole. Thus, the manufacturing of the internal combustion engine 10 is facilitated.

The embodiment described above may be modified as below.

Figure 14:
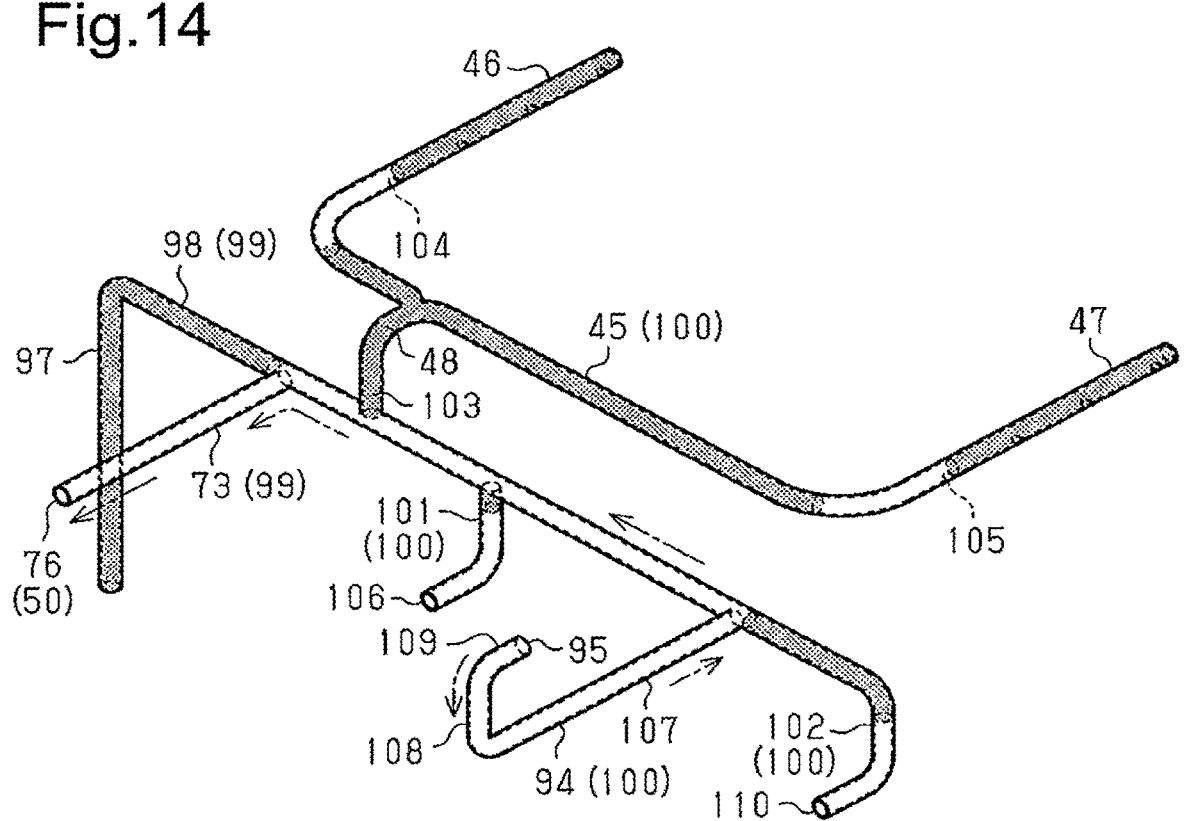
FIG. 14 is a perspective view showing a state in the oil feeding path of when the air is supplied to the vacuum pump through an opening hole of a pump oil path.
Figure 15:
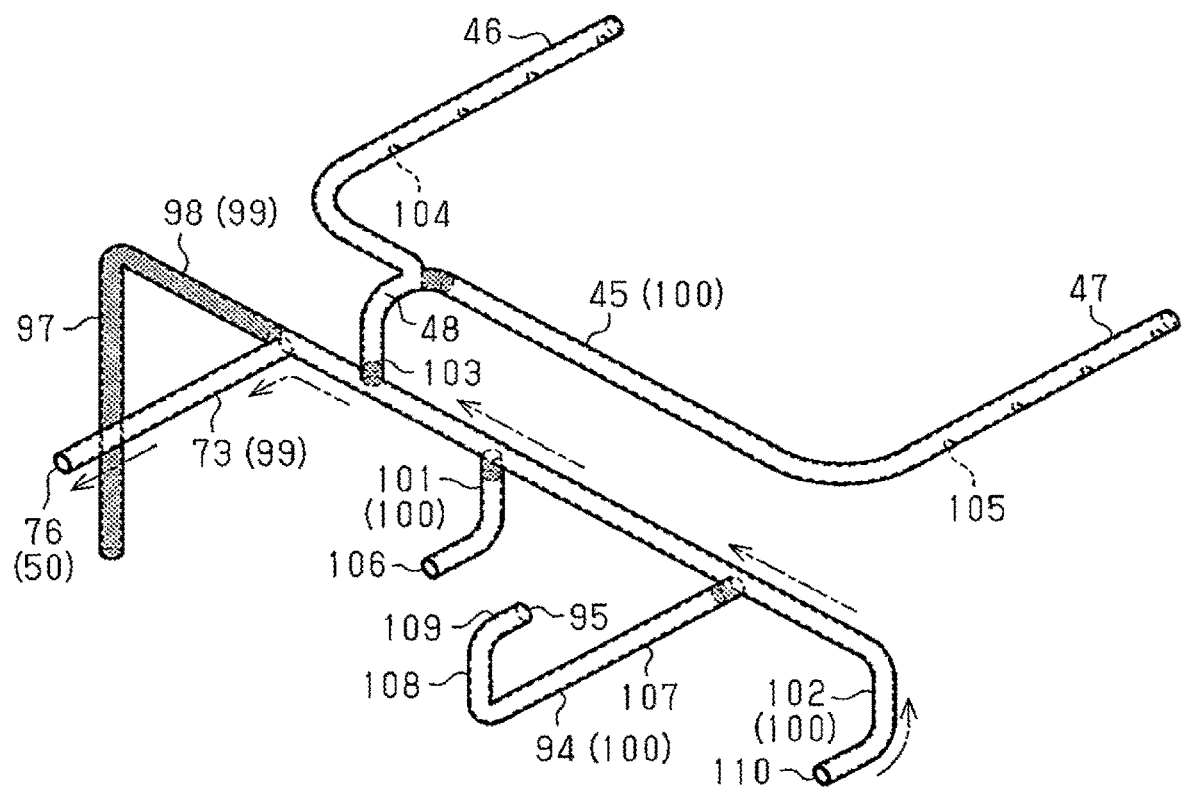
FIG. 15 is a perspective view showing a state in the oil feeding path of when the air is supplied to the vacuum pump through an opening hole of the second adjuster oil path.
Figure 16:
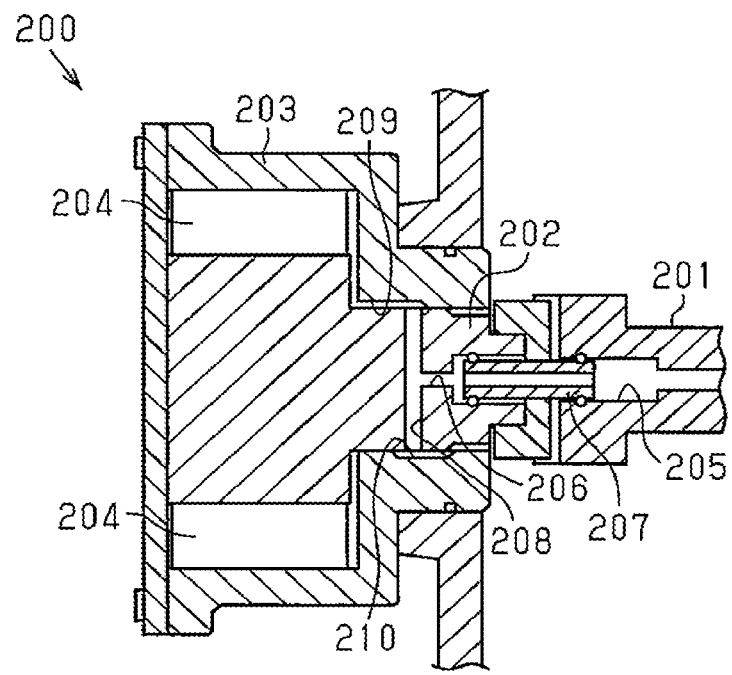
FIG. 16 is a longitudinal cross-sectional view of a vacuum pump provided on an internal combustion engine of the prior art.
Figure 17:
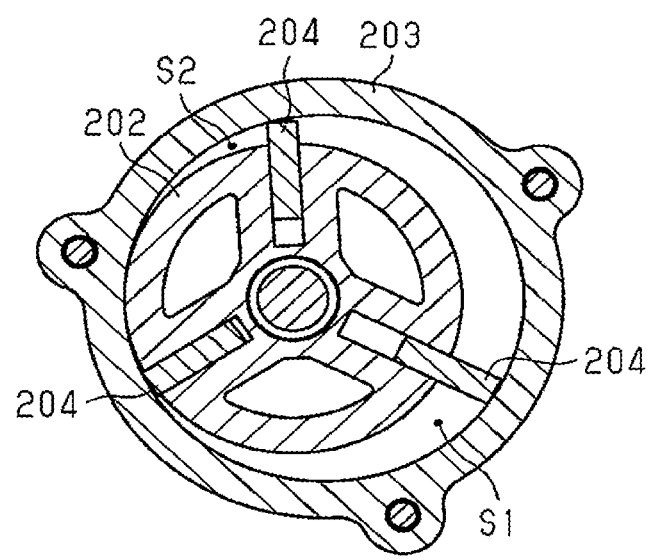
FIG. 17 is a transverse cross-sectional view of the vacuum pump.

The atmosphere communication hole may be an opening of another branched path 100 other than the first opening hole 104 of the cam shower pipe 45. For example, as shown in FIGS. 13 to 15, each opening hole other than the first opening hole 104 may be assumed as the atmosphere communication hole.

Figure 13:
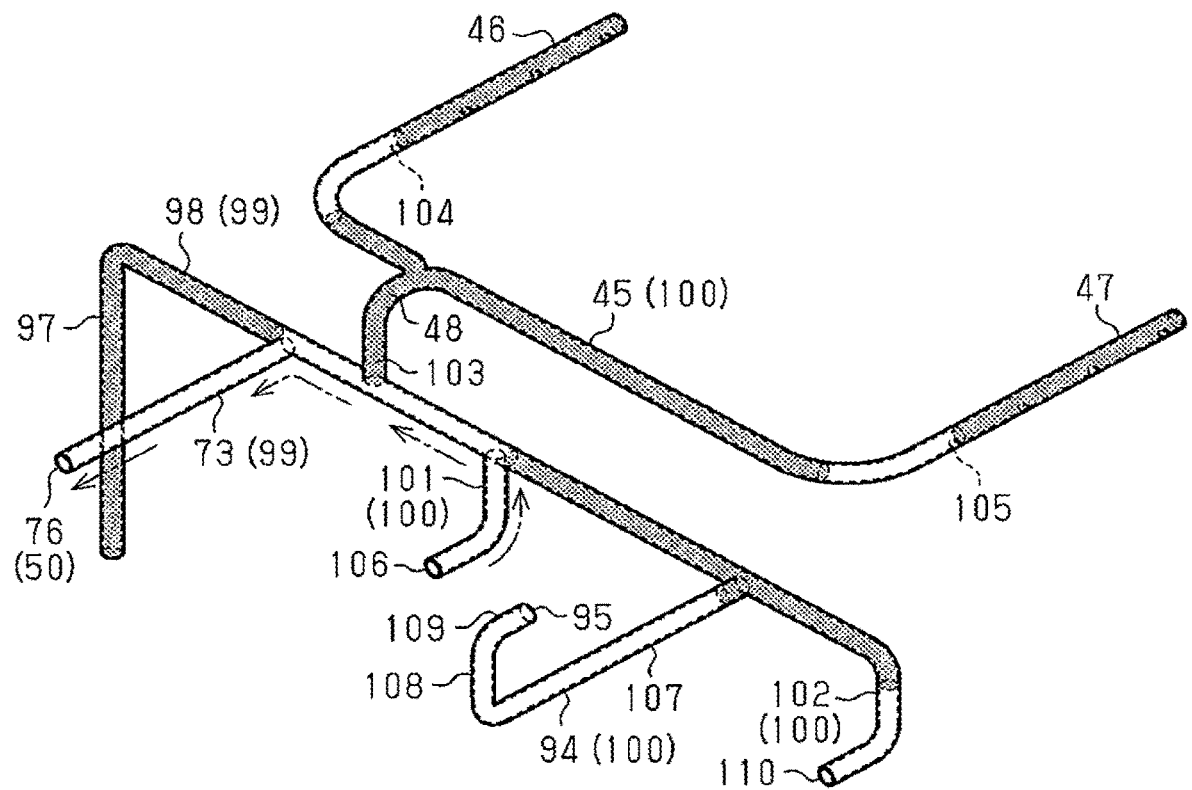
FIG. 13 is a perspective view showing a state in the oil feeding path of when the air is supplied to the vacuum pump through an opening hole of a first adjuster oil path.

In the example shown in FIG. 13, the opening hole 106 of the first adjuster oil path 101 functions as the atmosphere communication hole. For example, when the internal combustion engine 10 is stopped while the vehicle is inclined on an uphill road, and the like, each opening hole of the cam shower pipe 45 is sometimes arranged on the lower side of the opening hole 106 of the first adjuster oil path 101. In this case, the oil in the cam shower pipe 45 needs to be taken in against the gravitational force by the negative pressure remaining in the negative pressure chamber 75. Thus, in the above case, the air taken in from the opening hole 106 of the first adjuster oil path 101 reaches the vacuum pump before the air taken in from each opening hole of the cam shower pipe 45 reaches the transverse oil path 98. Thus, even if the configuration of the oil supplying path is the same as in the present embodiment, the opening hole to become the atmosphere communication hole is sometimes changed according to the state of the vehicle.

Furthermore, the opening hole to become the atmosphere communication hole may be changed by changing the passage cross-sectional area of each branched path 100 and adjusting the magnitude of the pressure loss of when the oil flows. In the example shown in FIG. 14, the pressure loss of the passage from the pump oil path 94 to the oil path 76 of the vacuum pump 50 is made smaller than the other passages, and the opening hole 95 of the pump oil path 94 is assumed as the atmosphere communication hole. In the example shown in FIG. 15, the pressure loss of the passage from the opening hole 110 of the second adjuster oil path 102 to the oil path 76 of the vacuum pump 50 is made smaller than the other passages, and the opening hole 110 of the second adjuster oil path 102 is assumed as the atmosphere communication hole. In this example, the opening hole 110 of the second adjuster oil path 102 most distant from the vacuum pump 50 is assumed as the atmosphere communication hole. In this case, a great amount of oil is taken in from the other opening holes 95, 104, 105, 106 before the air taken in from the opening hole 110 reaches the oil path 76 of the vacuum pump 50. In this case, the amount of oil remaining in the oil supplying path is reduced, but the amount of oil in the housing 52 can be suppressed to smaller than or equal to the allowable oil amount even if all the oil in the merging path 99 and each branched path 100 is taken in since the total capacity of the oil supplying path is smaller than or equal to the allowable amount.

The total capacity of the oil supplying path may be set to smaller than the allowable oil amount. In this case, the amount of oil in the housing 52 is more reliably prevented from exceeding the allowable oil amount.

The total capacity of the oil supplying path may be set to greater than or equal to the allowable oil amount. In this case, when the vacuum pump 50 is stopped, the negative pressure chamber 75 and the atmosphere are to be communicated by the atmosphere communication hole before all the oil in the merging path 99 and each branched path 100 is taken into the housing 52. Accordingly, the amount of oil in the housing 52 can be suppressed to smaller than or equal to the allowable oil amount even if the total capacity of the oil supplying path is greater than or equal to the allowable oil amount.

For example, the opening hole may be formed in the middle of the oil supplying path rather than at the distal end of the oil supplying path so that the oil remaining between the opening hole and the distal end of the oil supplying path is not suctioned. Furthermore, all the oil may be prevented from being taken into the housing 52 by adjusting the tube path resistance of each branched path 100 and differing the time until the air taken in from the opening hole of each branched path 100 reaches the oil path 76 of the vacuum pump 50. In such cases as well, the amount of oil in the housing 52 can be suppressed to smaller than or equal to the allowable oil amount.

At least one of the cam shower pipe 45, the first adjuster oil path 101, the pump oil path 94, and the second adjuster oil path 102 may be omitted. If all the branched paths 100 are omitted, a branched path may be newly arranged separate from the branched path 100 described above, and the atmosphere communication hole may be formed in such branched path.

The allowable oil amount was the maximum oil amount at which the resistance that acts on the vane 59 when the vacuum pump 50 is driven does not break the vane 59, but may be smaller than the maximum oil amount.

The method of driving each camshaft 24, 25 is not limited to the method of the embodiment described above. For example, a configuration of arranging a crank sprocket in place of the crank pulley 20 at one end of the crankshaft 11, arranging a timing sprocket in place of the timing pulley 26 at one end of the intake camshaft 24, arranging a timing sprocket in place of the timing pulley 27 at one end of the exhaust camshaft 25, and winding a timing chain around each sprocket may be adopted. Other than the description made above, a configuration of arranging a crank gear at one end of the crankshaft 11, and arranging a timing gear that gears with the crank gear at one end of each cam shaft 24, 25 to rotate each timing gear through the crank gear with the rotation of the crankshaft 11 may be adopted. Each camshaft 24, 25 can be driven in cooperation with the crankshaft 11 even with such configuration.

Other than the internal combustion engine in which the cylinders are arrayed in series, the internal combustion engine 10 may be a V-type internal combustion engine in which the cylinders are arrayed in a V-shape. The number of cylinders in the internal combustion engine 10 may be appropriately changed.

The invention claimed is:

1. An internal combustion engine comprising:
a camshaft;
a vacuum pump including a rotor and a housing that accommodates the rotor, the rotor being coupled to the camshaft to integrally rotate with the camshaft, the housing rotatably supporting the rotor, the vacuum pump interiorly including a negative pressure chamber defined by the rotor and the housing and an oil path connected to the negative pressure chamber, and a negative pressure being generated in the negative pressure chamber by rotation of the rotor;

an oil pump; and an oil supplying path that is connected to the oil pump, and that supplies oil to the oil path; wherein the oil supplying path includes an atmosphere communication hole that supplies air to the negative pressure chamber through the oil supplying path and the oil path when the vacuum pump is stopped;

the atmosphere communication hole supplies oil from the oil pump to a member other than the vacuum pump through the oil supplying path;

the atmosphere communication hole communicates the negative pressure chamber and the atmosphere before an amount of oil in the housing exceeds an allowable oil amount when the vacuum pump is stopped;

the oil supplying path includes a merging path connected to the oil path, and a plurality of branched paths branched and extended from the merging path;

a total capacity, that is a sum of a capacity of the merging path and a capacity of each branched path, is smaller than or equal to the allowable oil amount;

the merging path and each of the plurality of branched paths have a same cross-sectional area and the total capacity is set by varying lengths of the merging path and the branched paths; and the allowable oil amount is set to a maximum oil amount at which the resistance that acts on a vane when the vacuum pump is driven does not break the vane.

2. The internal combustion engine according to claim 1, wherein
a cam shower pipe that supplies oil to the camshaft is arranged as the branched path;
the cam shower pipe includes a plurality of opening holes for supplying oil to the camshaft by dropping; and
the atmosphere communication hole is an opening hole of the cam shower pipe.

3. The internal combustion engine according to claim 2, wherein a distance from the atmosphere communication hole to the oil path along the oil supplying path is shorter than distances from each of the plurality of opening holes to the oil path along the oil supplying path.

4. The internal combustion engine according to claim 1, wherein
a pump oil path connected to a fuel pump that pressure feeds fuel is arranged as the branched path;
an opening hole for supplying oil to the fuel pump is arranged at a distal end of the pump oil path; and
the atmosphere communication hole is an opening hole of the pump oil path.

5. The internal combustion engine according to claim 1, wherein
an adjuster oil path is arranged as the branched path, the adjuster oil path being connected to a hydraulic rush adjuster that adjusts a clearance between a cam arranged on the camshaft and a rocker arm;
an opening hole for supplying oil to the rush adjuster is arranged at a distal end of the adjuster oil path; and
the atmosphere communication hole is an opening hole of the adjuster oil path.

* * * * *